US011117836B2

(12) United States Patent
Wambaugh et al.

(10) Patent No.: US 11,117,836 B2
(45) Date of Patent: Sep. 14, 2021

(54) ULTRA STABLE STRUCTURAL LAMINATE

(71) Applicant: MITEK HOLDINGS, INC., Wilmington, DE (US)

(72) Inventors: James A. Wambaugh, Houston, TX (US); Brett Rochner, Houston, TX (US); Cole J. Weinberger, Houston, TX (US)

(73) Assignee: MiTek Holdings, Inc., Wilmington, DE (US)

( * ) Notice: Subject to any disclaimer, the term of this patent is extended or adjusted under 35 U.S.C. 154(b) by 0 days.

(21) Appl. No.: 16/216,687

(22) Filed: Dec. 11, 2018

(65) Prior Publication Data
US 2020/0181023 A1 Jun. 11, 2020

Related U.S. Application Data

(63) Continuation-in-part of application No. 16/006,554, filed on Jun. 12, 2018, now Pat. No. 10,167,230, and a continuation-in-part of application No. 16/006,570, filed on Jun. 12, 2018, now Pat. No. 10,167,231, and a continuation-in-part of application No. 16/006,583, filed on Jun. 12, 2018, now Pat. No. 10,227,259, and a continuation-in-part of application No. 16/006,598, filed on Jun. 12, 2018, now Pat. No. 10,167,232.

(60) Provisional application No. 62/582,517, filed on Nov. 7, 2017, provisional application No. 62/582,545, filed on Nov. 7, 2017.

(51) Int. Cl.
| | |
|---|---|
| C04B 28/32 | (2006.01) |
| C04B 14/18 | (2006.01) |
| C04B 14/28 | (2006.01) |
| C04B 14/38 | (2006.01) |
| E04C 2/04 | (2006.01) |
| E04C 2/26 | (2006.01) |
| C04B 14/42 | (2006.01) |
| B32B 13/02 | (2006.01) |
| B32B 13/04 | (2006.01) |
| B32B 5/18 | (2006.01) |
| C04B 103/65 | (2006.01) |

(52) U.S. Cl.
CPC ............... *C04B 28/32* (2013.01); *B32B 5/18* (2013.01); *B32B 13/02* (2013.01); *B32B 13/045* (2013.01); *C04B 14/18* (2013.01); *C04B 14/28* (2013.01); *C04B 14/386* (2013.01); *C04B 14/42* (2013.01); *E04C 2/044* (2013.01); *E04C 2/26* (2013.01); *B32B 2266/0228* (2013.01); *B32B 2266/0278* (2013.01); *B32B 2266/08* (2013.01); *C04B 2103/65* (2013.01); *E04B 2103/02* (2013.01)

(58) Field of Classification Search
CPC ......... C04B 28/32; C04B 14/18; E04C 2/044; B32B 5/18; B32B 13/02; B32B 2266/08
See application file for complete search history.

(56) References Cited

U.S. PATENT DOCUMENTS

| | | |
|---|---|---|
| 1,019,083 A | 3/1912 | Pink |
| 1,811,799 A | 6/1931 | Lukens |
| 1,853,522 A | 4/1932 | Stewart |
| 2,351,641 A | 6/1944 | Sohl et al. |
| 2,543,959 A | 3/1951 | Eastin |
| 2,702,753 A | 2/1955 | Dickey |
| 3,320,077 A | 5/1967 | Prior |
| 4,141,744 A | 2/1979 | Prior et al. |
| 4,158,570 A | 6/1979 | Irwin |
| 4,352,694 A | 10/1982 | Smith-Johannsen |
| 5,130,184 A | 7/1992 | Ellis |
| 5,434,200 A | 7/1995 | Kolker et al. |
| 6,200,381 B1 | 3/2001 | Rechichi |
| 6,319,579 B1 | 11/2001 | Strandgaard |
| 7,255,907 B2 | 8/2007 | Feigin et al. |
| 7,595,092 B2 | 9/2009 | Huddy et al. |
| 7,867,597 B2 | 1/2011 | Feigin et al. |
| 7,921,800 B2 | 4/2011 | Huddy et al. |
| 7,998,547 B2 | 8/2011 | Feigin et al. |
| 8,066,812 B2 | 11/2011 | Wu et al. |
| 8,603,237 B2 | 12/2013 | Rademan et al. |

(Continued)

FOREIGN PATENT DOCUMENTS

| | | |
|---|---|---|
| CN | 1049838 A | 3/1991 |
| CN | 1262171 A | 8/2000 |

(Continued)

OTHER PUBLICATIONS

International Search Report, PCT/US2018/067796, dated Mar. 27, 2019, 2 pages.
Deng, Dehua, "The mechanism for soluble phosphates to improve the water resistance of magnesium oxychloride cement," Cement and Concrete Research, vol. 33, 2003, pp. 1311-1317.
Deng, Dehua, "The formation mechanism of the hydrate phases in magnesium oxychloride cement," Cement and Concrete Research, vol. 29, 1999, pp. 1365-1371.
Feng et al., "Research on improving the water resistance of magnesium oxychloride cement," Gongneng Cailiao/Journal of Functional Materials, vol. 46, Issue 17, 2015, pp. 17038-17041 and 17045.

(Continued)

*Primary Examiner* — Hai Vo
(74) *Attorney, Agent, or Firm* — Stinson LLP

(57) ABSTRACT

An ultra-stable structural laminate with fire resistance and a lateral nail pull strength from 44 to 300 pounds of force and an insulation R value from 1 to 40, the ultra-stable structural laminate of a cementious material with a nano-molecular veneer and a foam component catalytically reacted into an expanded closed cell foam having a thickness from $\frac{1}{8}^{th}$ inch to 8 inches, a density from 1.5 pounds/cubic foot to 3 pounds/cubic foot that self-adheres to the cementitious material forming an ultra-stable structural laminate with fire resistance and a lateral nail pull strength from 44 pounds to 300 pounds of force, an insulation R value from 1 to 40, a resistance to seismic impact for earthquakes over 3.1 on the Richter Scale, a break point from 7 lbs/inch to 100 lbs/inch; and a resistance to wind shear equivalent to a 15 mph downburst.

15 Claims, 14 Drawing Sheets

(56) References Cited

U.S. PATENT DOCUMENTS

| | | |
|---|---|---|
| 8,959,861 B1 | 2/2015 | Wambaugh et al. |
| 2004/0126602 A1 | 7/2004 | Wallner |
| 2006/0070321 A1 | 4/2006 | Au |
| 2008/0275149 A1 | 11/2008 | Ladely et al. |
| 2009/0065972 A1 | 3/2009 | Feigin et al. |
| 2011/0088597 A1 | 4/2011 | Wu et al. |
| 2011/0108241 A1 | 5/2011 | Driscoll et al. |
| 2016/0304396 A1 | 10/2016 | Shand et al. |
| 2017/0283324 A1 | 10/2017 | Cul |

FOREIGN PATENT DOCUMENTS

| | | |
|---|---|---|
| CN | 1415574 A | 5/2003 |
| CN | 1450017 A | 10/2003 |
| CN | 1456528 A | 11/2003 |
| CN | 103553410 A | 2/2014 |
| WO | 2013151819 A1 | 10/2013 |

OTHER PUBLICATIONS

Walling et al., "Magnesia-Based Cements: A Journey of 150 Years, and Cements for the Future?," Chem. Rev. vol. 116, 2016, pp. 4170-4204.

Tan et al., "Effect of phosphoric acid on the properties of magnesium oxychloride cement as a biomaterial," Cement and Concrete Research, vol. 56, 2014, pp. 69-74.

Li et al., "The influence of compound additive on magnesium oxychloride cement/urban refuse floor tile," Construction and Building Materials, vol. 22, Issue 4, Apr. 2008, pp. 521-525.

Gochez et al., "(174h) Microstructure Characterization of Magnesium Oxide-Based Wallboard Composites for Enhanced Structural Properties and Fire/Water Resistance," 2014 AIChE Annual Meeting, Materials Engineering and Sciences Division, Characterization of Composites, 4 pages <https://www.aiche.org/conferences/aiche-annual-meeting/2014/proceeding/paper/174h-microstructure-characterization-magnesium-oxide-based-wallboard-composites-enhanced-structural-1>.

FIG. 1B

200 — FORMING A 35 WT% TO 79.9 WT% CEMENTITIOUS MATERIAL BASED ON THE FINAL TOTAL WEIGHT OF THE TILE BACKER BOARD

201 — BLENDING 29 WT% TO 40 WT% OF A MAGNESIUM OXIDE DRY POWDER CONTAINING 80 WT % TO 98WT % OF MAGNESIUM OXIDE BASED ON A FINAL TOTAL WEIGHT OF THE CEMENTITIOUS MATERIAL INTO 14 WT% TO 18 WT% OF A MAGNESIUM CHLORIDE DISSOLVED IN WATER BASED ON A FINAL TOTAL WEIGHT OF THE CEMENTITIOUS MATERIAL

202 — MIXING WITH A PLANETARY MIXER, THE MAGNESIUM OXIDE AND THE MAGNESIUM CHLORIDE IN WATER FORMING A LIQUID SUSPENSION WHILE MINIMIZING ADDING GAS INTO THE LIQUID SUSPENSION

204 — ADDING 0.1 WT% TO 10 WT% OF A STABILIZING MATERIAL WITH A PHOSPHORUS-CONTAINING COMPOUND BASED ON A FINAL TOTAL WEIGHT OF THE CEMENTITIOUS MATERIAL TO THE MIXED LIQUID SUSPENSION

206 — REACTING DURING A PRESET UNIT OF TIME, THE MIXED LIQUID SUSPENSION INTO AN AMORPHOUS PHASE CEMENTITIOUS MATERIAL

208 — BLENDING TO THE AMORPHOUS PHASE CEMENTITIOUS MATERIAL 0.1 WT% TO 30 WT% OF AN AGGREGATE COMPRISING PARTICLES BASED ON A FINAL TOTAL WEIGHT OF THE TILE BACKER BOARD, HAVING A DIAMETER FROM 1 NM TO 10 MM, WHEREIN THE AGGREGATE COMPRISES AT LEAST ONE OF: WOOD, PERLITE, STYRENE BASED FOAM BEADS, CALCIUM CARBONATE POWDER, GLASS PARTICULATE, AND COMBINATIONS THEREOF

210 — POURING THE FLOWABLE CONCRETE OVER 0.1 WT% TO 2 WT% OF A REINFORCING MATERIAL BASED ON A FINAL TOTAL WEIGHT OF THE TILE BACKER BOARD FORMING A REINFORCED CONCRETE

212 — FORMING DURING A PRESET UNIT OF TIME, IN A PORTION OF THE AMORPHOUS PHASE CEMENTITIOUS MATERIAL A PLURALITY OF CRYSTALS OF A DEFINED MOLECULAR WEIGHT FROM THE AMORPHOUS NON-CRYSTALLINE NANO-MOLECULAR CEMENTITIOUS MATERIAL ENCAPSULATING THE PLURALITY OF CRYSTALS, CREATING A NANO-MOLECULAR VENEER WITHOUT DETECTABLE PHOSPHORUS-CONTAINING COMPOUND WHILE INCREASING SURFACE AREA OF THE PLURALITY OF CRYSTALS

214 — TESTING THE FORMED TILE BACKER BOARD FOR STABILITY IN WATER AT 60 DEGREES CELSIUS FOR 24 HOURS USING THE JET PRODUCTS, LLC WARM WATER STABILITY TEST AS AUTHENTICATED BY CLEMSON UNIVERSITY CHEMICAL ENGINEERING DEPARTMENT IN 2017

FIG. 1C

*220* — ADDING FROM 0.1 WT% TO 15 WT% BIOMASS TO THE AMORPHOUS PHASE CEMENTITIOUS MATERIAL BASED ON THE FINAL TOTAL WEIGHT OF THE TILE BACKER BOARD

*222* — ADDING FROM 0.1 WT% TO 10 WT% OF AT LEAST ONE SURFACTANT WHICH IS ADDED TO THE CEMENTITIOUS MATERIAL BASED ON THE FINAL TOTAL WEIGHT OF THE TILE BACKER BOARD TO DECREASE POROSITY OF AGGREGATE AND PREVENT AMORPHOUS PHASE CEMENTITIOUS MATERIAL FROM ENTERING PORES OF THE AGGREGATE

*224* — ADDING FROM 0.1 WEIGHT PERCENT TO 5 WEIGHT PERCENT OF A RE-DISPERSIBLE POWDER POLYMER BASED ON THE FINAL TOTAL WEIGHT OF THE TILE BACKER BOARD INTO THE AMORPHOUS PHASE CEMENTITIOUS MATERIAL

*226* — BLENDING FROM 0.1 WEIGHT PERCENT TO 5 WEIGHT PERCENT OF AN ACRYLIC OR STYRENE BUTADIENE RUBBER (SBR) BASED ON THE FINAL TOTAL WEIGHT OF THE TILE BACKER BOARD INTO THE AMORPHOUS CEMENTITIOUS MATERIAL WITH THE RE-DISPERSIBLE POWDER POLYMER

FIG. 1D

| FORMING FROM 55 WT% TO 99.8 WT% OF A CEMENTITIOUS MATERIAL BASED ON THE FINAL TOTAL WEIGHT OF THE TILE BACKER BOARD |
|---|

↓ 252

| FORMING FROM 55 WT% TO 99.8WT% OF A CEMENTITIOUS MATERIAL BY BLENDING 29WT% TO 40 WT% OF A MAGNESIUM OXIDE DRY POWDER CONTAINING FROM 80 WT% TO 98 WT% OF MAGNESIUM OXIDE BASED ON A FINAL TOTAL WEIGHT OF THE BASED ON THE CEMENTITIOUS MATERIAL WITH FROM 14 WT% OF 18 WT% OF A MAGNESIUM CHLORIDE DISSOLVED IN WATER BASED ON BASED ON THE FINAL TOTAL WEIGHT OF THE CEMENTITIOUS MATERIAL, TO FORM A LIQUID SUSPENSION |
|---|

↓ 254

| ADDING FROM 0.1 WT% TO 10 WT% OF A STABILIZING MATERIAL WITH A PHOSPHORUS-CONTAINING COMPOUND BASED ON A FINAL TOTAL WEIGHT OF THE CEMENTITIOUS MATERIAL TO THE LIQUID SUSPENSION |
|---|

↓ 256

| ALLOWING THE LIQUID SUSPENSION TO REACT INTO AN AMORPHOUS PHASE CEMENTITIOUS MATERIAL DURING A PRESET PERIOD OF TIME |
|---|

↓ 258

| INVOLVE ADDING FROM 0.1 WT% TO 30 WT% OF AN AGGREGATE BASED ON THE TOTAL WEIGHT OF THE TILE BACKER BOARD TO THE AMORPHOUS PHASE CEMENTITIOUS MATERIAL |
|---|

↓ 260

| ADDING FROM 0.1 WT% TO 15 WT% OF A REINFORCING MATERIAL BASED ON THE FINAL TOTAL WEIGHT OF THE TILE BACKER BOARD, TO THE AMORPHOUS PHASE CEMENTITIOUS MATERIAL, WHEREIN THE REINFORCING MATERIAL IS AT LEAST ONE OF: CHOPPED SILICA CONTAINING FIBERS; HEMP CONTAINING FIBERS; NANO-MOLECULAR CARBON FIBER STRANDS; CHOPPED CARBON FIBERS; CHOPPED HYDROCARBON FIBER; AND COMBINATIONS THEREOF |
|---|

↓ 262

| INVOLVE GROWING A PORTION OF THE AMORPHOUS PHASE CEMENTITIOUS MATERIAL GROWS A PLURALITY OF CRYSTALS, EACH CRYSTAL HAVING A MW WITHIN THE RANGE OF 283 TO 709, THE AMORPHOUS PHASE CEMENTITIOUS MATERIAL ENCAPSULATING THE PLURALITY OF CRYSTALS, WHEREIN A MAJORITY OF STABILIZING MATERIAL WITH A PHOSPHORUS-CONTAINING COMPOUND ARE CONSUMED INTO A NANO-MOLECULAR VENEER WHILE INCREASING SURFACE AREA OF THE PLURALITY OF CRYSTALS BY 2% TO 49% DURING CURING, AND WHEREIN THE NANO-MOLECULAR ELEMENTS OF THE CURED NANO-MOLECULAR VENEER ARE INSOLUBLE IN WATER AND THE CURED NANO- MOLECULAR VENEER PROTECTS THE PLURALITY OF CRYSTALS FROM DEGRADATION IN WATER AT TEMPERATURES FROM 20 DEGREES TO 60 DEGREES CELSIUS FOR FROM 24 HOURS TO 56 DAYS OF THE FORMED TILE BACKER BOARD |
|---|

↓ 263

| CATALYTICALLY REACTING A FOAM COMPONENT INTO AN EXPANDED CLOSED CELL FOAM HAVING A THICKNESS FROM 1/8TH INCH TO 8 INCHES AND A DENSITY FROM 1.5 POUNDS/CUBIC FOOT TO 3 POUNDS/CUBIC FOOT THAT SELF-ADHERES TO THE CEMENTITIOUS MATERIAL FORMING AN ULTRA-STABLE STRUCTURAL LAMINATE WITH FIRE RESISTANCE AND A LATERAL NAIL PULL STRENGTH FROM 44 TO 300 POUNDS OF FORCE, AN INSULATION R VALUE FROM 1 TO 40, A RESISTANCE TO SEISMIC IMPACT FOR EARTHQUAKES OVER 3.1 ON THE RICHTER SCALE, A BREAK POINT FROM 7 TO 100 LBS/INCH; AND A RESISTANCE TO WIND SHEAR EQUNALENT TO A 15 MPH DOWNBURST |
|---|

FIG. 3A

CEMENTITIOUS MATERIAL

| STARTING MATERIAL | Sample 1 | Sample 2 |
|---|---|---|
| MAGNESIUM OXIDE DRY POWDER IN CEMENTITIOUS MATERIAL | 29 wt% | 40 wt% |
| MAGNESIUM CHLORIDE DISSOLVED IN WATER IN CEMENTITIOUS MATERIAL | 14 wt% | 18 wt% |
| STABILIZING MATERIAL WITH PHOSPHORUS-CONTAINING COMPOUND IN CEMENTITIOUS MATERIAL (PHOSPHORIC ACID) | 0 wt% | 10 wt% |
| STABILIZING MATERIAL WITH PHOSPHORUS-CONTAINING COMPOUND IN CEMENTITIOUS MATERIAL (PHOSPHOROUS ACID) | 0.1 wt% | 0 wt% |
| REINFORCING COMPONENT IN FORMULATION (WOVEN SILICA CONTAINING COMPOUND) | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0 wt% | 0 wt% |
| FINAL FORMULATION | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 85 wt% | 55 wt% |
| AMORPHOUS PHASE CEMENTITIOUS MATERIAL AS DETERMINED BY X RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 12 wt% | 43 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 2 wt% | 4.5 wt% |
| MAGNESIUM CRYSTAL CONTENT OF THE CEMENTITIOUS MATERIAL PERCENTAGE RETAINED | 2% | 81% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 20 $m^2/g$ | 29 $m^2/g$ |

A) WOOD, PERLITE, STYRENE FOAM BEADS IN A 30:8:1 RATIO
B) VINYL ACETATE ETHYLENE

FIG. 3B

| CEMENTITIOUS MATERIAL | | |
|---|---|---|
| *STARTING MATERIAL* | Sample 3 | Sample 4 |
| MAGNESIUM OXIDE DRY POWDER IN CEMENTITIOUS MATERIAL | 32 wt% | 31 wt% |
| MAGNESIUM CHLORIDE DISSOLVED IN WATER IN CEMENTITIOUS MATERIAL | 17 wt% | 16 wt% |
| STABILIZING MATERIAL WITH PHOSPHORUS-CONTAINING COMPOUND IN CEMENTITIOUS MATERIAL (PHOSPHORIC ACID) | 0.1 wt% | 1 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION (WOVEN SILICA CONTAINING COMPOUND) | 0.1 wt% Non-Woven Silica-Containing Mat | 2 wt% Chopped Silica Fibers |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 87 wt% | 80 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 10 wt% | 17 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 2 wt% | 13 wt% |
| MAGNESIUM CRYSTAL CONTENT OF THE CEMENTITIOUS MATERIAL PERCENTAGE RETAINED | 2 wt% | 16% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 20 $m^2/g$ | 24 $m^2/g$ |

A) WOOD, PERLITE, STYRENE FOAM BEADS IN A 30:8:1 RATIO
B) VINYL ACETATE ETHYLENE

FIG. 3C

| CEMENTITIOUS MATERIAL | | |
|---|---|---|
| STARTING MATERIAL | Sample 5 | Sample 6 |
| MAGNESIUM OXIDE DRY POWDER IN CEMENTITIOUS MATERIAL | 32.5 wt% | 33 wt% |
| MAGNESIUM CHLORIDE DISSOLVED IN WATER IN CEMENTITIOUS MATERIAL | 17.5 wt% | 18 wt% |
| STABILIZING MATERIAL WITH PHOSPHORUS-CONTAINING COMPOUND IN CEMENTITIOUS MATERIAL (PHOSPHORIC ACID) | 1.75 wt% | 2.5 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION (WOVEN SILICA CONTAINING COMPOUND) | 0 wt% | 0 wt% |
| AGGREGATE IN FORMULATION | 0.1 wt% [A] | 30 wt% [A] |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0 wt% | 0 wt% |
| FINAL FORMULATION | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 77 wt% | 74 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 21 wt% | 24 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 35 wt% | 51 wt% |
| MAGNESIUM CRYSTAL CONTENT OF THE CEMENTITIOUS MATERIAL PERCENTAGE RETAINED | 46% | 69% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 27 $m^2/g$ | 29 $m^2/g$ |

A) WOOD, PERLITE, STYRENE FOAM BEADS IN A 30:8:1 RATIO
B) VINYL ACETATE ETHYLENE

FIG. 3D

CEMENTITIOUS MATERIAL

| STARTING MATERIAL | Sample 7 | Sample 8 |
|---|---|---|
| MGO DRY POWDER IN CEMENTITIOUS MATERIAL | 33 wt% | 32 wt% |
| MAGNESIUM CHLORIDE DISSOLVED IN WATER IN CEMENTITIOUS MATERIAL | 19 wt% | 17 wt% |
| STABILIZING MATERIAL WITH PHOSPHORUS-CONTAINING COMPOUND IN CEMENTITIOUS MATERIAL (PHOSPHORIC ACID) | 3.75 wt% | 5 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION | 0 wt% | 0 wt% |
| AGGREGATE IN FORMULATION | 0 wt% | 0 wt% |
| BIOMASS IN FORMULATION | 0.1 wt% Rice Husks | 15 wt% Corn Husks |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0 wt% | 0 wt% |
| FINAL FORMULATION | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 70 wt% | 67 wt% |
| AMORPHOUS PHASE CEMENTITIOUS MATERIAL AS DETERMINED BY X RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 28 wt% | 31 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 51 wt% | 48 wt% |
| MAGNESIUM CRYSTAL CONTENT OF THE CEMENTITIOUS MATERIAL PERCENTAGE RETAINED | 73% | 72% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 29 $m^2/g$ | 28 $m^2/g$ |

A) WOOD, PERLITE, STYRENE FOAM BEADS IN A 30:8:1 RATIO
B) VINYL ACETATE ETHYLENE

FIG. 3E

| CEMENTITIOUS MATERIAL | | |
|---|---|---|
| *STARTING MATERIAL* | Sample 9 | Sample 10 |
| MGO DRY POWDER IN CEMENTITIOUS MATERIAL | 35 wt% | 30 wt% |
| MAGNESIUM CHLORIDE DISSOLVED IN WATER IN CEMENTITIOUS MATERIAL | 16 wt% | 18 wt% |
| STABILIZING MATERIAL WITH PHOSPHORUS-CONTAINING COMPOUND IN CEMENTITIOUS MATERIAL (PHOSPHORIC ACID) | 6.25 wt% | 7.5 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0.1 wt% Detergent | 10 wt% Sodium Stearate |
| RE-DISPERSIBLE POLYMER POWDER IN FORMULATION | 0 wt% | 0 wt% |
| ACRYLIC IN FOTMULATION | 0 wt% | 0 wt% |
| STYRENE BUTADIENE RUBBER (SBR) IN IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 64 wt% | 61 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 34 wt% | 37 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 47 wt% | 43 wt% |
| MAGNESIUM CRYSTAL CONTENT OF THE CEMENTITIOUS MATERIAL PERCENTAGE RETAINED | 73% | 70% |
| SURFACE AREA OF THE CEMENTITIOUS MATERIAL AS DETERMINED USING NITROGEN ABSORPTION AND CALCULATED USING THE BRUNAUER-EMMETT-TELLER (BET) THEORY WITH QUANTACHROME ASIQWIN AUTOMATED SORPTION DATA ACQUISITION AND REDUCTION | 24 m$^2$/g | 27 m$^2$/g |

A) WOOD, PERLITE, STYRENE FOAM BEADS IN A 30:8:1 RATIO
B) VINYL ACETATE ETHYLENE

FIG. 3F

CEMENTITIOUS MATERIAL

| STARTING MATERIAL | Sample 11 | Sample 12 |
|---|---|---|
| MGO DRY POWDER IN CEMENTITIOUS MATERIAL | 33 wt% | 32 wt% |
| MAGNESIUM CHLORIDE DISSOLVED IN WATER IN CEMENTITIOUS MATERIAL | 15 wt% | 19 wt% |
| STABILIZING MATERIAL WITH PHOSPHORUS-CONTAINING COMPOUND IN CEMENTITIOUS MATERIAL (PHOSPHORIC ACID) | 8.75 wt% | 10 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0.1 wt% VAE[B] | 5 wt% VAE[B] |
| ACRYLIC IN FORMULATION | 0 wt% | 0 wt% |
| STYRENE BUTADIENE RUBBER (SBR) IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 57 wt% | 50 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 41 wt% | 48 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 41 wt% | 45 wt% |
| MAGNESIUM CRYSTAL CONTENT OF THE CEMENTITIOUS MATERIAL PERCENTAGE RETAINED | 72% | 90% |
| SURFACE AREA OF THE CEMENTITIOUS MATERIAL AS DETERMINED USING NITROGEN ABSORPTION AND CALCULATED USING THE BRUNAUER-EMMETT-TELLER (BET) THEORY WITH QUANTACHROME ASIQWIN AUTOMATED SORPTION DATA ACQUISITION AND REDUCTION | 29 $m^2/g$ | 29 $m^2/g$ |

A) WOOD, PERLITE, STYRENE FOAM BEADS IN A 30:8:1 RATIO
B) VINYL ACETATE ETHYLENE

FIG. 3G
CEMENTITIOUS MATERIAL

| STARTING MATERIAL | Sample 13 | Sample 14 |
|---|---|---|
| MAGNESIUM OXIDE DRY POWDER IN CEMENTITIOUS MATERIAL | 31 wt% | 36 wt% |
| MAGNESIUM CHLORIDE DISSOLVED IN WATER IN CEMENTITIOUS MATERIAL | 14 wt% | 18 wt% |
| STABILIZING MATERIAL WITH PHOSPHORUS-CONTAINING COMPOUND IN CEMENTITIOUS MATERIAL (PHOSPHORIC ACID) | 0 wt% | 2 wt% |
| STABILIZING MATERIAL WITH PHOSPHORUS-CONTAINING COMPOUND IN CEMENTITIOUS MATERIAL (PHOSPHOROUS ACID) | 1 wt% | 0 wt% |
| REINFORCING COMPONENT IN FORMULATION (WOVEN SILICA CONTAINING COMPOUND) | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0.1 wt% Acrylic | 0.1 wt% Acrylic |
| STYRENE BUTADIENE RUBBER (SBR) IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 75 wt% | 73 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 23 wt% | 25 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 34 wt% | 50 wt% |
| MAGNESIUM CRYSTAL CONTENT OF THE CEMENTITIOUS MATERIAL PERCENTAGE RETAINED | 45% | 68% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 26 $m^2/g$ | 29 $m^2/g$ |

A) WOOD, PERLITE, STYRENE FOAM BEADS IN A 30:8:1 RATIO
B) VINYL ACETATE ETHYLENE

FIG. 3H

| CEMENTITIOUS MATERIAL | | |
|---|---|---|
| STARTING MATERIAL | Sample 15 | Sample 16 |
| MAGNESIUM OXIDE DRY POWDER IN CEMENTITIOUS MATERIAL | 32 wt% | 31 wt% |
| MAGNESIUM CHLORIDE DISSOLVED IN WATER IN CEMENTITIOUS MATERIAL | 17 wt% | 16 wt% |
| STABILIZING MATERIAL WITH PHOSPHORUS-CONTAINING COMPOUND IN CEMENTITIOUS MATERIAL (PHOSPHORIC ACID) | 4 wt% | 3 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION (WOVEN SILICA CONTAINING COMPOUND) | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0.1 wt% SBR | 5 wt% SBR |
| FINAL FORMULATION | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 69 wt% | 66 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 29 wt% | 32 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 49 wt% | 48 wt% |
| MAGNESIUM CRYSTAL CONTENT OF THE CEMENTITIOUS MATERIAL PERCENTAGE RETAINED | 71% | 73% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 29 $m^2$/g | 29 $m^2$/g |

A) WOOD, PERLITE, STYRENE FOAM BEADS IN A 30:8:1 RATIO
B) VINYL ACETATE ETHYLENE

FIG. 4

| H3PO4 added | MgO powder purity | MgO Source | MgCh Brine concentration | MgO/MgClı weight ratio | Aggregate Percentage | Magnesium oxychloride crystal content | MOC crystal content after 24 hour soak in 60C water |
|---|---|---|---|---|---|---|---|
| wt% | wt% | | wt% | | wt% | wt% | wt% |
| 0 | 98 | U.S. | 28 | 2:1 | 16 | 67 | 4 |
| 1.25 | 98 | U.S. | 28 | 2:1 | 16 | 53 | 25 |
| 2.5 | 98 | U.S. | 28 | 2:1 | 16 | 46 | 35 |
| 0 | 85 | China | 28 | 2:1 | 15 | 57 | 2 |
| 1.5 | 85 | China | 28 | 2:1 | 15 | 44 | 25 |
| 3 | 85 | China | 28 | 2:1 | 15 | 44 | 40 |

ULTRA STABLE STRUCTURAL LAMINATE

CROSS REFERENCE TO RELATED APPLICATIONS

The present application claims priority to and the benefit of U.S. Non Provisional patent application Ser. Nos. 16/006,554, 16/006,570, 16/006,583 and 16/006,598 which claim priority to U.S. Provisional Patent Application Ser. No. 62/582,517 filed on Nov. 7, 2017, entitled "PROCESS FOR MAKING A CEMENTITIOUS CONSTRUCTION MATERIAL" and U.S. Provisional Patent Application Ser. No. 62/582,545 filed on Nov. 7, 2017, entitled "CEMENTITIOUS CONSTRUCTION MATERIAL". All these references are hereby incorporated in their entirety.

FIELD

The present embodiment generally relates to an ultra-stable structural laminate with fire resistance and insulation properties and an ability to resist seismic impact and wind shear.

BACKGROUND

A need exists for ultra-stable structural laminates with fire resistance isolative properties, resistance to seismic impact and wind shear as well as resistance to mold, mildew, and termites.

The present embodiments meet these needs.

BRIEF DESCRIPTION OF THE DRAWINGS

The detailed description will be better understood in conjunction with the accompanying drawings as follows:

FIG. 1A-1D depicts the stepwise process for making a cementitious material that can be deposited on the foam forming the ultra-stable structural laminate.

FIG. 3A-3H depicts a table of cementitious material formulations containing reinforcing components and aggregate and other additives along with physical properties of the formulations usable with the expanded foam component of the ultra-stable structural laminate.

FIG. 4 is a table showing various additional cementitious material formulations for use on the foam of the ultra-stable structural laminate.

Figure 1A:
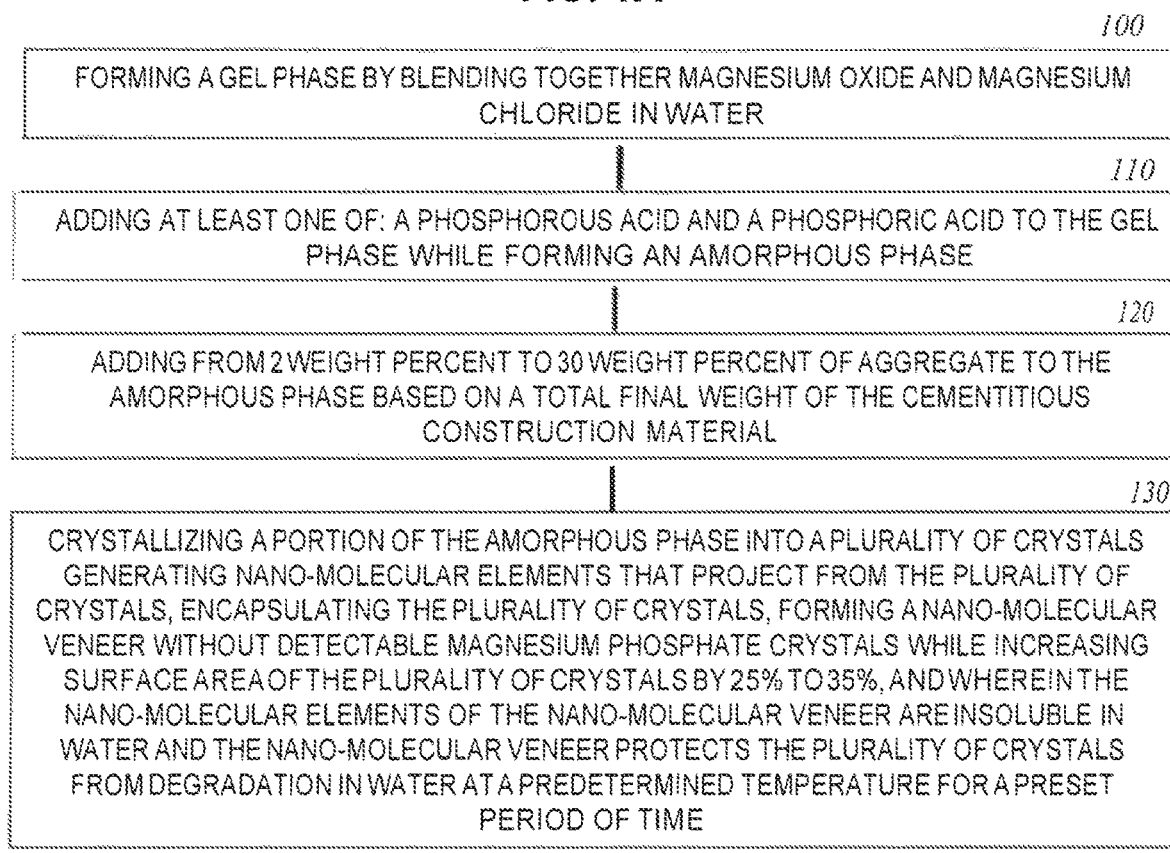

The present embodiments are detailed below with reference to the listed Figures.

DETAILED DESCRIPTION OF THE EMBODIMENTS

Before explaining the ultra-stable structural laminate in detail, it is to be understood that the ultra-stable structural laminate is not limited to the particular embodiments and that it can be practiced or carried out in various ways.

The invention relates to an ultra-stable structural laminate with fire resistance and a lateral nail pull strength from 44 to 300 pounds of force and an insulation R value from 1 to 40, the ultra-stable structural laminate of a cementitious material with a nano-molecular veneer and a foam component catalytically reacted into an expanded closed cell foam having a thickness from $1/8^{th}$ inch to 8 inches, a density from 1.5 pounds/cubic foot to 3 pounds/cubic foot that self-adheres to the cementitious material forming an ultra-stable structural laminate with fire resistance; a lateral nail pull strength from 44 pounds to 300 pounds of force, an insulation R value from 1 to 40; a resistance to seismic impact for earthquakes over 3.1 on the Richter Scale, a break point from 7 lbs/inch to 100 lbs/inch; and a resistance to wind shear equivalent to a 15 mph downburst.

More specifically, the invention relates to a cementitious material having 29 wt % to 40 wt % of a magnesium oxide dry powder containing 80 wt % to 98 wt % of magnesium oxide based on a final total weight of the cementitious material, the magnesium oxide with a surface area ranging from 5 meters$^2$/gram to 50 meters$^2$/gram and an average particle size ranging from about 0.3 to about 90 microns wherein more than about 90% by weight magnesium oxide particles are less than or equal to about 40 microns.

In addition, the cementitious material includes 14 wt % to 18 wt % of a magnesium chloride dissolved in water based on the final total weight of the cementitious material.

The cementitious material also includes 0.1 wt % to 10 wt % of a stabilizing material with a phosphorus-containing compound based on the final total weight of the cementitious material.

The stabilizing material with the phosphorus-containing compound can be a phosphorous acid (A) based on the final total weight of the cementitious material, wherein the phosphorous acid consists of an aqueous solution of 55 wt % to 65 wt % of a concentrate of $H_3PO_3$; or a phosphoric acid (B) based on the final total weight of the cementitious material, wherein the phosphoric acid consists of an aqueous solution of 80 wt % to 90 wt % of a concentrate of $H_3PO_4$.

A portion of the amorphous phase cementitious material grows a plurality of crystals, each crystal having a MW within the range of 280 to 709, the amorphous phase cementitious material encapsulating the plurality of crystals, wherein a majority of stabilizing material with a phosphorus-containing compound are consumed into a nano-molecular veneer while increasing surface area of the plurality of crystals by 2% to 49% during curing.

The nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed cementitious material.

The ultra-stable structural laminate includes a foam component is catalytically reacted into an expanded closed cell foam having a thickness from $1/8^{th}$ inch to 8 inches and a density from 1.5 pounds/cubic foot to 3 pounds/cubic foot that self-adheres to the cementitious material forming an ultra-stable structural laminate with fire resistance and a lateral nail pull strength from 44 to 300 pounds of force, an insulation R value from 1 to 40, a resistance to seismic impact for earthquakes over 3.1 on the Richter Scale, a break point from 7 to 100.

In embodiments, the expanded closed cell foam of the ultra-stable structural laminate is a pentane blown closed cell polyurethane foam.

In embodiments, the ultra-stable structural laminate foam component is at least one member of the group: a polyurethane, a polyisocyanurate or a polystyrene.

The invention relates to a process for making an ultra-stable structural laminate includes a sequence of steps for making ultra-stable cementitious construction material consisting of a crystallized portion with an amorphous nano-molecular veneer substantially free of crystalline silica for disposition on the expanded foam while the foam is still and an increased temperature.

The first step of the process for forming the cementitious construction material involves forming a gel phase by blending together magnesium oxide and magnesium chloride in a water with a weight ratio of from 1.9:1 to 2.1:1 of magnesium oxide to magnesium chloride.

In the process for forming the cementitious construction material, from 2 weight percent to 30 weight percent of aggregate is added to the gel phase, forming an amorphous phase.

Phosphorous acid or phosphoric acid or both are then added to the amorphous phase, actuating crystallization of a portion of the amorphous phase, while simultaneously forming a nano-molecular veneer encapsulating the crystallized portion of the amorphous phase without detectable magnesium phosphate and with from 2% to 49% increase in surface area as compared to veneer-free crystallized portions, and wherein the crystallized portion with nano-molecular veneer is configured to resist degradation in water having a temperature at 60 degrees C. for 48 hours.

Benefits of the process for forming the cementitious construction material are as follows: increased cement stability when submerged in water at temperatures up to 60 degrees C.; a physical property that determines warm water stability for the above cement and no additional time required for this invention.

Benefits of the cementitious material formulation include increased cement stability when submerged in water at temperatures up to 60 degrees C. and improved racking for resistance to seismic events and wind sheer.

A significant benefit of the ultra-stable structural laminate is the integration of the cementitious material with nano-molecular veneer into the expanded closed cell foam just after expanding forming the ultra-stable structural laminate, without degrading or losing the structural advantages of the nano-molecular veneer and without the need for nails or glue or epoxy, that may otherwise be required for construction materials.

The invention provides an ultra-stable structural laminate with increased stability in environments with high temperatures and high moisture.

The invention provides for the ultra-stable structural laminate, a cementitious material with a protective layer that is not an exposed crystal, so it is not susceptible to moisture or water dissolving at elevated temperatures.

The ultra-stable structural laminate resists corrosion in the presence of water.

This ultra-stable structural laminate has fire resistance and an improved water tolerance over other types of materials containing magnesium oxychloride cements without adding polymers or other sealants that can sacrifice some of the excellent fire-resistant properties of magnesium oxychloride cements.

The ultra-stable structural laminate has a cementitious material with an unexpected amorphous layer that protects the magnesium oxychloride cement crystals is less detrimental to the structural strength of the cement product than other uses of phosphoric compounds have proven to be.

The invention relates to a process for making a cementitious construction material consisting of a crystallized portion with an amorphous nano-molecular veneer substantially free of crystalline silica for use with the expanded polyurethane foam to create the ultra-stable structural laminate.

The first step of the process for making the ultra-stable structural laminate includes cementitious material involves forming a gel phase by blending together magnesium oxide and magnesium chloride in a water with a weight ratio of from 1.9:1 to 2.1:1 of magnesium oxide to magnesium chloride.

In the process for making the ultra-stable structural laminate the cementitious material is blended with from 2 weight percent to 30 weight percent of aggregate while in the gel phase, forming an amorphous phase.

Phosphorous acid or phosphoric acid or both are then added to the amorphous phase, actuating crystallization of a portion of the amorphous phase, while simultaneously forming a nano-molecular veneer encapsulating the crystallized portion of the amorphous phase without detectable magnesium phosphate and with a 2% to 49% increase in surface area as compared to veneer-free crystallized portions, and wherein the crystallized portion with nano-molecular veneer is configured to resist degradation in water having a temperature at 60 degrees C. for 48 hours.

Benefits of the process for making the cementitious material are as follows: increased cement stability when submerged in water at temperatures up to 60 degrees C., a physical property that determines warm water stability for the above cement, and no additional time required for this invention.

In an embodiment, ultra-stable cementitious material with nano-molecular veneer includes: 0.1 wt % to 30 wt % of an aggregate based on a final total weight of the concrete.

The aggregate can include particles having a diameter from 1 nm to 10 mm, wherein the aggregate comprises at least one of: wood, perlite, styrene based foam beads, calcium carbonate powder, glass particulate, and combinations thereof.

In an embodiment, ultra-stable cementitious material with nano-molecular veneer can can include: 0.1 wt % to 2 wt % of a reinforcing material based on a final total weight of the cementitious material, the reinforcing material comprising a non-woven or woven silica containing mat, a non-woven or woven hydrocarbon containing mat.

In an embodiment, ultra-stable cementitious material with nano-molecular veneer can includes: 0.1 weight percent to 15 weight percent biomass added to the amorphous phase cementitious material based on the final total weight of the concrete.

The biomass can be a member of the group comprising: rice husks, corn husks, and dung.

In an embodiment, ultra-stable cementitious material with nano-molecular veneer can includes: 0.1 wt % to 10 wt % of at least one surfactant to the cementitious material based on the final total weight of the concrete to decrease porosity of aggregate and prevent amorphous phase cementitious material from entering pores of the aggregate.

The surfactant can be a detergent.

In an embodiment, ultra-stable cementitious material with nano-molecular veneer can include: 0.1 weight percent to 5 weight percent of a re-dispersible powder polymer based on the final total weight of the concrete.

The re-dispersible powder polymer is selected from the group consisting of silicon, polyurethane dispersion, polyurethane, alkyl carboxylic acid vinyl ester monomer, branched and unbranched alcohol(meth)acrylic acid ester monomer, vinyl aromatic monomer, olefin monomer, diene monomer and vinyl halide monomer or a vinyl acetate ethylene "VAE".

In an embodiment, ultra-stable cementitious material with nano-molecular veneer can include: 0.1 weight percent to 5 weight percent based on the final total weight of the cementitious material of an acrylic or styrene butadiene rubber (SBR) into the concrete while the re-dispersible powder polymer is added.

In an embodiment, ultra-stable cementitious material with nano-molecular veneer can include: 0.1 wt % to 15 wt % of a reinforcing material based on the final total weight of the concrete.

The reinforcing material can include at least one of: chopped silica containing fibers; hemp containing fibers; nano-molecular carbon fiber strands; chopped carbon fibers; chopped hydrocarbon fiber; and combinations thereof.

It should be noted that this unique laminate, does not requires weatherization prior to inspection of a nail patterns because only finishing seams are required.

The unique laminate is flame resistant which is a significance advantage over known weatherizing building products.

The following definitions are used herein:

The term "aggregate" refers to a wood, perlite, foam beams, glass, calcium carbonate powder, or carbon fiber strands with a particle size no larger than 3 mm.

The term "amorphous phase" refers to a non-crystalline mixture of the final reacted products.

The term "amorphous nano-molecular veneer" refers to a coating bonded to the crystallized portion that has a material which is not visible as crystalline in an X-ray diffraction test, and has a density of molecules which is inert to water molecules.

The term "biomass" refers to organic materials such as wood flour, straw, ground pecan shells, and ground up bagasse.

The term "cementitious construction material" refers to a board or structure that is used for structural assembly to form facilities, offices, barns, homes, fences, and marine quarters for use on a ship or oil platform offshore.

The term "crystallized portion" refers to a segment of the created cementitious construction material with activation energies of 70 kilojoules per mole, having a monoclinic crystalline structure which in this invention includes magnesium oxychloride.

The term "crystalline silica" refers to silica molecules, such as sand, in a crystalline phase, similar to glass.

The term "dispersible polymer" is a water dispersible ethylene-vinyl acetate copolymer.

The term "encapsulating" refers to the creation of a nano-molecular veneer over surfaces of the crystals wherein the surface coating can be connected, such as sandpaper which comprises many silica particles adhered to a substrate with very little space between the silica particles. The dendritic nature of the plurality of crystals provide a coating that may be continuous or have small gaps.

The term "fibers" refers to needle-like materials that do not exceed 3 mm in length, but could include longer fibers woven into a mat.

The term "gel phase" refers to a phase in which molecules attract to each other without bonding in a slurry.

The term "insoluble in water" refers to a compound that will not go into solution or degrade when exposed to water between ambient temperature and 60 degrees C. for 0 hours to 48 hours.

The term "magnesium chloride in a water" refers to a liquid containing anhydrous magnesium chloride salt such as a water containing an anhydrous magnesium chloride salt with from 20 to 35 weight percent salt in the water which can be distilled water, dirty water containing particulates and non-volatile organic matter, or clean tap water.

The term "magnesium oxide" refers to the powder form of MgO with from 80% to 98% purity, the balance being calcium carbonate, quartz, or iron oxide or similar impurities naturally found in magnesite.

The term "magnesium phosphate crystals" refers to the crystals formed by the reaction of magnesium oxide with phosphoric acid or phosphorous acid.

The term "nano-molecular elements" refers to the newly identified, insoluble in water, non-crystalline, phosphorous-containing species; identifiable with scan electron microscope (SEM) with elemental analysis. This material will not show up as a phosphorous containing species on XRAY DIFFRACTION.

The term "phosphoric acid" refers to a concentrate of $H_3PO_4$ with a density of 1.1 g/ml to 1.85 g/ml.

The term "phosphorous acid" refers a concentrate of $H_3PO_3$ with a density of 1.1 g/ml to 1.65 g/ml.

The term "plurality of crystals" refers to the magnesium oxychloride crystals which form from part of the amorphous phase.

The term "predetermined temperature for the water" refers to a temperature from ambient temperature to 90 degrees C.".

The term "preset period of time" refers to a window of time from 10 hours to 90 hours, and specifically includes from 24 hours to 72 hours.

The phrase "protects the plurality of crystals from degradation in water" refers to the nano-molecular veneer making the strength loss lower than it would be without the nano-molecular veneer when the cementitious material is exposed to water between ambient temperature and 60 degrees C. for 0-48 hours.

The term "substantially free" refers to a less than 3 weight percent content of crystalline silica based on x-ray diffraction testing in the cementitious construction material.

The term "surface area" refers to the surface area as tested using the BET theory methodology.

The term "veneer" refers to a chemically bonded protective layer on the crystallized portion of the amorphous phase configured to resist water which can be elevated to 60 degrees C. for extended periods of time.

The term "water" refers to $H_2O$ with impurities of less than 0.5 weight percent.

The aggregate includes particles based on a final total weight of the cementitious material, having a diameter from 1 nm to 10 mm.

The aggregate contains at least one of: wood, perlite, styrene based foam beads, calcium carbonate powder, glass particulate, and combinations thereof.

The cementitious material with aggregate is blended to the amorphous phase with from 0.1 wt % to 2 wt % of a reinforcing material based on a final total weight of the cementitious material.

The reinforcing material can be a non-woven or woven silica containing mat, a non-woven, or woven hydrocarbon containing mat.

In other embodiments, the reinforcing material can be chopped silica containing fibers; hemp containing fibers; nano-molecular carbon fiber strands; chopped carbon fibers; chopped hydrocarbon fiber; and combinations thereof.

The amorphous phase cementitious material containing aggregate can be poured over the reinforcing material enabling a portion of the amorphous phase cementitious material to grow a plurality of crystals, each crystal having a MW within the range of 280 to 709, the amorphous phase cementitious material encapsulating the plurality of crystals.

A majority of stabilizing material with a phosphorus-containing compound can be consumed into a nano-molecular veneer while increasing surface area of the plurality of crystals by 2% to 49% during curing, and wherein the nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed cementitious material.

In embodiments of the cementitious material, 0.1 weight percent to 15 weight percent biomass can be added to the amorphous phase cementitious material based on the final total weight of the cementitious material.

In embodiments of the cementitious material, 0.1 wt % to 10 wt % of at least one surfactant is added to the cementitious material based on the final total weight of the cementitious material to decrease porosity of aggregate and prevent amorphous phase cementitious material from entering pores of the aggregate.

In embodiments of the cementitious material, 0.1 weight percent to 5 weight percent of a re-dispersible powder polymer based on the final total weight of the cementitious material can be incorporated in the amorphous phase cementitious material.

In embodiments of the cementitious material, the re-dispersible powder polymer can be selected from the group consisting of acrylic, silicon, polyurethane dispersion, polyurethane, alkyl carboxylic acid vinyl ester monomer, branched and unbranched alcohol(meth)acrylic acid ester monomer, vinyl aromatic monomer, olefin monomer, diene monomer and vinyl halide monomer.

In embodiments of the cementitious material, 0.1 weight percent to 5 weight percent based on the final total weight of the cementitious material of an acrylic or styrene butadiene rubber (SBR) can be blended into the amorphous cementitious material with the re-dispersible powder polymer.

In embodiments of the cementitious material, 0.1 weight percent to 5 weight percent based on the final total weight of the cementitious material of a re-dispersible polymer powder can be added to the amorphous cementitious material, wherein the re-dispersible polymer powder is a member of the group consisting of: a vinyl ethylene ester and ethylene, a vinyl laurate vinyl chloride copolymer, a vinyl ester monomers, (meth)acrylate monomer, a vinyl aromatic monomer, an olefin monomer, a 1,3-diene monomer, a vinyl halide monomer, a homopolymer or copolymer derived from one or more monomers selected from the group consisting of a vinyl acetate, a vinyl ester of an alpha-branched monocarboxylic acids having from 9 to 11 carbon atoms, a vinyl chloride, an ethylene, a methyl acrylate, a methyl methacrylate, an ethyl acrylate, an ethyl methacrylate, a propyl acrylate, a propyl methacrylate, an n-butyl acrylate, a n-butyl methacrylate, an 2-ethylhexyl acrylate.

The invention relates to a building with an exterior building surface covered with the cementitious material of the formulations of the independent claims of this application.

FIG. 1A shows the steps of the invention.

The process for making a cementitious construction material as step 100: forming a gel phase by blending together magnesium oxide and magnesium chloride in water.

Step 110 can involve adding at least one of: a phosphorous acid and a phosphoric acid to the gel phase while forming an amorphous phase.

Step 120 can require adding from 2 weight percent to 30 weight percent of aggregate to the amorphous phase based on a total final weight of the cementitious construction material.

Step 130 can involve crystallizing a portion of the amorphous phase into a plurality of crystals generating nano-molecular elements that project from the plurality of crystals, encapsulating the plurality of crystals, forming a nano-molecular veneer without detectable magnesium phosphate crystals while increasing surface area of the plurality of crystals by 2% to 49%, and wherein the nano-molecular elements of the nano-molecular veneer are insoluble in water and the nano-molecular veneer protects the plurality of crystals from degradation in water at a predetermined temperature for a preset period of time.

In embodiments, the process for making a cementitious construction material can include adding from 0.1 weight percent to 15 weight percent biomass to the gel phase based on the total final weight of the cementitious construction material.

In embodiments, the process for making a cementitious construction material can involve adding from 0.1 weight percent to 5 weight percent of a dispersible polymer to the gel phase based on the total final weight of the cementitious construction material.

FIG. 1B shows a first embodiment incorporating the fewest steps needed to make the cementitious material.

Step 200 can include forming from 35 wt % to 79.9 wt % of a cementitious material based on the final total weight of the cementitious material.

Step 201 can involve blending from 29 wt % to 40 wt % of a magnesium oxide dry powder containing 80 wt % to 98 wt % of magnesium oxide based on a final total weight of the cementitious material into 14 wt % to 18 wt % of a magnesium chloride dissolved in water based on a final total weight of the cementitious material.

Step 202 can involve mixing with a planetary mixer, the magnesium oxide and the magnesium chloride in water forming a liquid suspension while minimizing adding gas into the liquid suspension.

Step 204 can involve adding from 0.1 wt % to 10 wt % of a stabilizing material with a phosphorus-containing compound based on a final total weight of the cementitious material to the mixed liquid suspension.

Step 206 can involve reacting during a preset unit of time, the mixed liquid suspension into an amorphous phase cementitious material.

Step 208 can involve blending to the amorphous phase cementitious material from 0.1 wt % to 30 wt % of an aggregate comprising particles based on a final total weight of the tile backer board, having a diameter from 1 nm to 10 mm, wherein the aggregate comprises at least one of: wood, perlite, styrene based foam beads, calcium carbonate powder, glass particulate, and combinations thereof.

Step 210 can involve pouring the flowable concrete over from 0.1 wt % to 2 wt % of a reinforcing material based on a final total weight of the tile backer board forming a reinforced concrete.

Step 212 can involve forming during a preset unit of time, in a portion of the amorphous phase cementitious material a plurality of crystals of a defined Molecular Weight from the amorphous non-crystalline nano-molecular cementitious material encapsulating the plurality of crystals, creating a nano-molecular veneer without detectable phosphorus-containing compound while increasing surface area of the plurality of crystals.

STEP 213 can involve catalytically reacting a foam component into an expanded closed cell foam having a thickness from 1/8th inch to 8 inches and a density from 1.5 pounds/cubic foot to 3 pounds/cubic foot that self-adheres to the cementitious material forming an ultra-stable structural laminate with fire resistance and a lateral nail pull strength from 44 to 300 pounds of force, an insulation R value from 1 to 40, a resistance to seismic impact for earthquakes over 3.1 on the Richter Scale, a break point from 7 to 100 lbs/inch; and a resistance to wind shear equivalent to a 15 mph downburst.

FIG. 1C depicts additional steps to be used with the embodiment of FIG. 1A to make the cementitious material.

FIG. 1C depicts:

Step 220 can include adding from 0.1 wt % to 15 wt % biomass to the amorphous phase cementitious material based on the final total weight of the cementitious material.

Step 222 can include adding from 0.1 wt % to 10 wt % of at least one surfactant which is added to the cementitious material based on the final total weight of the cementitious material to decrease porosity of aggregate and prevent amorphous phase cementitious material from entering pores of the aggregate.

Step 224 can include adding from 0.1 weight percent to 5 weight percent of a re-dispersible powder polymer based on the final total weight of the cementitious material into the amorphous phase cementitious material.

Step 226 can include blending from 0.1 weight percent to 5 weight percent of an acrylic or styrene butadiene rubber (SBR) based on the final total weight of the cementitious material into the amorphous cementitious material with the re-dispersible powder polymer.

FIG. 1D shows steps of another embodiment to make the cementitious material forming a tile baker board.

Step 250 can include forming from 55 wt % to 99.8 wt % of a cementitious material based on the final total weight of the tile backer board.

Step 252 can include forming from 55 wt % to 99.8 wt % of a cementitious material by blending 29 wt % to 40 wt % of a magnesium oxide dry powder containing from 80 wt % to 98 wt % of magnesium oxide based on a final total weight of the based on the cementitious material with from 14 wt % of 18 wt % of a magnesium chloride dissolved in water based on based on the final total weight of the tile backer board, to form a liquid suspension.

Step 254 can involve adding from 0.1 wt % to 10 wt % of a stabilizing material with a phosphorus-containing compound based on a final total weight of the tile backer board to the liquid suspension.

Step 256 can include allowing the liquid suspension to react into an amorphous phase cementitious material during a preset period of time.

Step 258 can involve adding from 0.1 wt % to 30 wt % of an aggregate based on the total weight of the tile backer board to the amorphous phase cementitious material.

Step 260 can involve adding from 0.1 wt % to 15 wt % of a reinforcing material based on the final total weight of the tile backer board, to the amorphous phase cementitious material, wherein the reinforcing material is at least one of: chopped silica containing fibers; hemp containing fibers; nano-molecular carbon fiber strands; chopped carbon fibers; chopped hydrocarbon fiber; and combinations thereof.

Step 262 can involve growing a portion of the amorphous phase cementitious material grows a plurality of crystals, each crystal having a MW within the range of 283 to 709, the amorphous phase cementitious material encapsulating the plurality of crystals, wherein a majority of stabilizing material with a phosphorus-containing compound are consumed into a nano-molecular veneer while increasing surface area of the plurality of crystals by 2% to 49% during curing, and wherein the nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed tile backer board.

Step 263 involves catalytically reacting a foam component into an expanded closed cell foam having a thickness from 1/8th inch to 8 inches and a density from 1.5 pounds/cubic foot to 3 pounds/cubic foot that self-adheres to the cementitious material forming an ultra-stable structural laminate with fire resistance and a lateral nail pull strength from 44 to 300 pounds of force, an insulation R value from 1 to 40, a resistance to seismic impact for earthquakes over 3.1 on the Richter Scale, a break point from 7 to 100 lbs/inch; and a resistance to wind shear equivalent to a 15 mph downburst.

In embodiments, the cementitious construction material can create a nano-molecular veneer with a thickness from 1 microns to 3 microns.

In embodiments, the cementitious construction material can be used to create a cementitious construction material configured to support a load of at least 2.5 pounds per square foot.

In embodiments, the cementitious construction material produces product can be used to create a home, an office, a warehouse, a shed, a dock, artwork, aqueducts, or another load supporting structure.

In embodiments, the water is a brine or similar salt solution with a concentration of 2% to 30% salt.

In embodiments, the cementitious construction material can contain fibers.

In variations of the cementitious construction material, prior to crystallizing the amorphous phase, an additional substrate can be introduced and coated with the cementitious construction material having oriented strand board, plywood, waterproof membrane, concrete, and wood, and coated with the amorphous phase increasing fire resistance and stability in hot water.

The cementitious construction material can include least one surfactant added to the amorphous phase to decrease porosity of aggregates and prevent amorphous phase from entering pores of the aggregates.

The surfactants can be any molecule that reduces the surface porosity of the aggregates being used in the cement.

In embodiments, the amorphous phase can be crystallized using a temperature from 40 to 50 degrees C. for a period of time from 3 to 24 hours, at a relative humidity from 30 to 100 percent.

In embodiments, the cementitious construction material can be formed using an exothermic reaction, such as generating 10 to 15 degrees of heat for the duration of the reaction.

In embodiments, the cementitious construction material gel phase can be formed using intimate mixing for at least 3 minutes prior to adding aggregate.

Figure 2:
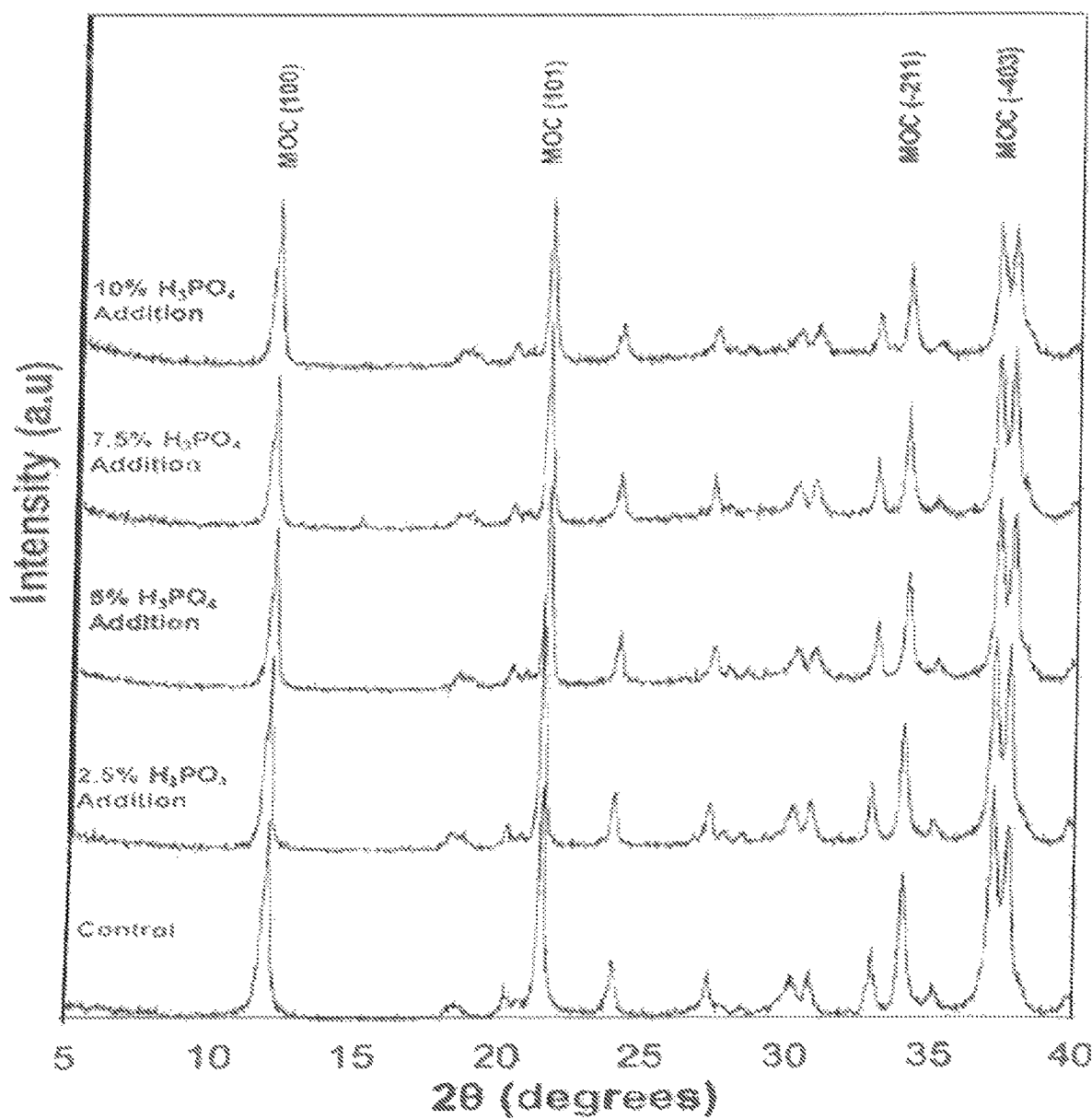
FIG. 2 depicts the X-ray diffraction pre-treatment and post-treatment of magnesium oxychloride with phosphoric acid usable in creating the cementitious material usable on the closed cell foam of the ultra-stable structural laminate.

FIG. 2 shows diffractograms of cured samples produced from X-ray diffraction at 28 degrees C. The major 5 phase peaks are labelled. The four upper quadrants are post phosphoric acid treatment and the bottom quadrant is pre phosphoric acid treatment.

The importance of this FIG. 2 is the area under the peaks.

EXAMPLE 1

A ultra-stable structural laminate is formed with a cementitious material formed by blending 29 wt % to 40 wt % of a magnesium oxide dry powder containing 80 wt % to 98 wt % of magnesium oxide based on a final total weight of the cementitious material, with 14 wt % to 18 wt % of a magnesium chloride dissolved in water and reacting to form a liquid suspension, mixing from 2 to 10 minutes, adding a phosphorus-containing material, and allowing the liquid suspension to react into an amorphous phase cementitious material, wherein a portion of the amorphous phase cementitious material grows a plurality of crystals forming a nano-molecular veneer. After forming the cementitious material, a foam component is catalytically reacted into an expanded closed cell foam having a thickness from $1/8^{th}$ inch to 8 inches and a density from 1.5 pounds/cubic foot to 3 pounds/cubic foot that self-adheres to the cementitious material forming an ultra-stable structural laminate with fire resistance and a lateral nail pull strength from 44 to 300 pounds of force, an insulation R value from 1 to 40, a resistance to seismic impact for earthquakes over 3.1 on the Richter Scale, a break point from 7 to 100 lbs/inch; and a resistance to wind shear equivalent to a 15 mph downburst.

The cementitious material of this example has a 78% crystallized portion with 12% of an amorphous nano-molecular veneer substantially free of crystalline silica.

To create the cementitious material, first a gel phase is formed by blending together magnesium oxide powder with a purity of 85% by weight and a magnesium chloride in a brine with density of 1.26.

The magnesium oxide is blended in a weight ratio of 2:1 with the magnesium chloride based on the total final weight of the cementitious construction material.

Next, from 20 weight percent of aggregate from wood is added to the gel phase forming the amorphous phase.

To the amorphous phase, 5 weight percent of phosphoric acid is added based on the total final weight of the cementitious construction material.

To complete forming of the cementitious material, 65% of the amorphous phase is crystalized by extruding the amorphous phase between two layers of fiberglass on a carrier sheet. The sandwich-like material is cured at 45 to 55 degrees Centigrade for 12 to 24 hours at a relative humidity greater than 55% creating a board with a thickness of 12 mm.

A nano-molecular veneer is formed over the crystallized portion with a veneer thickness of 1 micron encapsulating the portion of the crystallized portion without producing detectable magnesium phosphate. The nano-molecular veneer has a 30% increase in surface area as compared to veneer-free crystallized portions.

The final crystallized portion with nano-molecular veneer is configured to resist degradation in water having a temperature at 60 degrees C. for 48 hours.

In this example, the foam component is polyurethane and the foam component is expanded catalytically into an expanded closed cell foam having a specific thickness of $1/8^{th}$ inch and a specific density of 1.5 pounds/cubic foot that self-adheres to the cementitious material forming an ultra-stable structural laminate with fire resistance and a lateral nail pull strength of 40 pounds of force, an insulation R value of 1, a resistance to seismic impact for earthquakes over 3.1 on the Richter Scale, a break point of 7 lbs/inch; and a resistance to wind shear equivalent to a 15 mph downburst.

EXAMPLE 2

The novel cementitious material is formed by first combining 34 wt % of a magnesium oxide dry powder containing 85 wt % purity of magnesium oxide based on a final total weight of the cementitious material.

The magnesium oxide used has a surface area ranging from 5 meters$^2$/gram to 50 meters/gram and an average particle size ranging from about 0.3 to about 90 microns wherein more than about 90% by weight magnesium oxide particles are less than or equal to about 40 microns.

16 wt % of a magnesium chloride was dissolved in water based on a final total weight of the cementitious material. The magnesium chloride in aqueous solution was: 29 wt % of a magnesium chloride aqueous solution. The magnesium oxide and the magnesium chloride in water reacted to form a liquid suspension.

1.3 wt % of a stabilizing material with a phosphorus-containing compound based on a final total weight of the cementitious material was then mixed with the liquid suspension and the mixture reacted into an amorphous phase cementitious material.

The stabilizing material with the phosphorus-containing compound was phosphoric acid (B) based on the final total weight of the cementitious material, wherein the phosphoric acid consisted of an aqueous solution of 85 wt % of a concentrate of $H_3PO_4$. The mixture reacted into an amorphous phase cementitious material.

The amorphous phase cementitious material grows a plurality of crystals, each crystal having a MW of 530 generating nano-molecular elements that project from the plurality of crystals, encapsulating the plurality of crystals, wherein a majority of stabilizing material with a phosphorus-containing compound are consumed into the non-molecular veneer while increasing surface area of the plurality of crystals by 49%, and wherein the nano-molecular elements of the nano-molecular veneer are insoluble in water and the nano-molecular veneer protects the plurality of crystals from degradation in water at 60 degrees Celsius for 24 hours forming the cementitious material.

In this example, the foam component is polyisocyanurate wherein the polyisocyanurate is catalytically expanded into an expanded closed cell foam having a thickness of 3 inches, a density of 2 pounds/cubic foot that self-adheres to the cementitious material forming an ultra-stable structural laminate with fire resistance and a lateral nail pull strength of 100 pounds of force, an insulation R value of 12, a resistance to seismic impact for earthquakes over 3.1 on the Richter Scale, a break point of 15 lbs/inch; and a resistance to wind shear equivalent to a 15 mph downburst.

EXAMPLE 3

The ultra-stable structural laminate includes a cementitious material which for this example, has 35 wt % of a magnesium oxide dry powder containing 80 wt % purity of magnesium oxide based on a final total weight of the cementitious material.

The magnesium oxide used has a surface area ranging from 5 meters$^2$/gram to 50 meters$^2$/gram and an average particle size ranging from about 0.3 to about 90 microns wherein more than about 90% by weight magnesium oxide particles are less than or equal to about 40 microns.

15 wt % of a magnesium chloride dissolved in water based on a final total weight of the cementitious material was mixed with the magnesium oxide, In this example, the magnesium chloride in aqueous solution was a 27 wt % a magnesium chloride aqueous solution. The magnesium oxide and the magnesium chloride in water were mixed and react to form a liquid suspension.

2.5 wt % of a stabilizing material with a phosphorus-containing compound based on a final total weight of the cementitious material was mixed with the liquid suspension, the mixture reacted into an amorphous phase cementitious material, the stabilizing material with the phosphorus-containing compound contained a phosphorous acid (A) based on the final total weight of the cementitious material. The phosphorous acid consisted of an aqueous solution of 60 wt % of a concentrate of $H_3PO_3$.

A portion of the amorphous phase cementitious material grew a plurality of crystals, developed with each crystal having a MW of 283, 413, 530, or 709, generating nano-molecular elements that projected from the plurality of crystals, encapsulating the plurality of crystals.

A majority of phosphorous-containing compounds from the stabilizing material with a phosphorus-containing compound were consumed into the non-molecular veneer while increasing surface area of the plurality of crystals by 2 to 49%.

The nano-molecular elements of the nano-molecular veneer were insoluble in water and the nano-molecular veneer protected the plurality of crystals from degradation in water at 60 degrees Celsius for 24 hours as the cementitious material.

In this example, the foam component is polystyrene and the polystyrene is expanded, such as with a catalyst, into an expanded closed cell foam having a thickness of 2 inches and a density of 2.5 pounds/cubic foot that self-adheres to the cementitious material forming an ultra-stable structural laminate with fire resistance and a lateral nail pull strength of 80 pounds of force, an insulation R value of 12, a resistance to seismic impact for earthquakes over 3.1 on the Richter Scale, a break point of 12 lbs/inch; and a resistance to wind shear equivalent to a 15 mph downburst.

FIGS. 3A-3H show many samples of the formulation of the cementitious material and their associated physical properties which are integrated without the use of glues or expoxies or nails into an expanded closed cell foam.

Sample 1 of the ultra-stable structural laminate contains a cementitious material with 29 wt % of a magnesium oxide dry powder based on a final total weight of the cementitious material was used. The magnesium oxide dry powder containing 85 wt % purity of magnesium oxide.

The magnesium oxide had a surface area ranging from 5 meters$^2$/gram to 50 meters/gram and an average particle size ranging from about 0.3 to about 90 microns wherein more than about 90% by weight magnesium oxide particles were less than or equal to about 40 microns.

The magnesium oxide was blended with 14 wt % of a magnesium chloride dissolved in water based on a final total weight of the cementitious material.

For Sample 1, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 0.1 wt % of a stabilizing material with a phosphorus-containing compound based on a final total weight of the cementitious material to the mixed liquid suspension.

For Sample 1, the stabilizing material with the phosphorus-containing compound was a phosphorous acid based on the final total weight of the cementitious material, wherein the phosphorous acid consists of an aqueous solution of 60 wt % of a concentrate of $H_3PO_3$.

The liquid suspension with stabilizing material was permitted to react into an amorphous phase cementitious material for a period of time of 2 minutes.

The flowable, uncured cementitious material was then poured on a mold to cure and form a cement.

For this Sample 1, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 2% to 20 m$^2$/g.

The cured material of Sample 1 formed a cementitious material which as stable in water at 60 degrees Celsius for 24 hours using the Jet Products, LLC Warm Water Stability Test as authenticated by Clemson University Chemical Engineering Department in 2017.

In this example, the foam component is a polyurethane and the polyurethane is expanded into an expanded closed cell foam having a thickness of 2 inches and a density of 1.7 pounds/cubic foot that self-adheres to the cementitious material forming an ultra-stable structural laminate with fire resistance and a lateral nail pull strength of 120 pounds of force, an insulation R value of 12, a resistance to seismic impact for earthquakes over 3.1 on the Richter Scale, a break point of 40 lbs/inch; and a resistance to wind shear equivalent to a 15 mph downburst.

Sample 2

Sample 2 of the ultra-stable structural laminate contains a cementitious material with 40 wt % of a magnesium oxide dry powder containing 85 wt % of magnesium oxide based on a final total weight of the of the cementitious material was used.

The magnesium oxide had a surface area ranging from 5 meters$^2$/gram to 50 meters/gram and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 2, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 10 wt % of a stabilizing material with a phosphorus-containing compound based on a final total weight of the cementitious material to the mixed liquid suspension.

For Sample 2, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

The flowable, uncured cementitious material was then poured on a mold and cured, forming a cement.

For this Sample 2, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 49% to 29 $m^2/g$.

The cured material of Sample 2 formed a cementitious material which as stable in water at 60 degrees Celsius for 24 hours using the Jet Products, LLC Warm Water Stability Test as authenticated by Clemson University Chemical Engineering Department in 2017.

In this example, a foam component of polyurethane was catalytically expanded into an expanded closed cell foam having a thickness of 1 inch and a density of 1.7 pounds/cubic foot that self-adheres to the cementitious material as the cementitious material cures forming an ultra-stable structural laminate with fire resistance and a lateral nail pull strength of 96 pounds of force, an insulation R value of 8, a resistance to seismic impact for earthquakes over 3.1 on the Richter Scale, a break point of 23 lbs/inch; and a resistance to wind shear equivalent to a 15 mph downburst.

Sample 3

Sample 3 of the ultra-stable structural laminate contains a cementitious material with 32 wt % of a magnesium oxide dry powder containing 85 wt % of magnesium oxide based on a final total weight of the of the cementitious material was used.

The magnesium oxide had a surface area ranging from 5 meters$^2$/gram to 50 meters/gram and an average particle size ranging from about 0.3 to about 90 microns wherein more than about 90% by weight magnesium oxide particles were less than or equal to about 40 microns.

The magnesium oxide was blended with 17 wt % of a magnesium chloride dissolved in water based on a final total weight of the cementitious material.

For Sample 3, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 0.1 wt % of a stabilizing material with a phosphorus-containing compound based on a final total weight of cementitious material the mixed liquid suspension.

For Sample 3, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

The reinforcing component was a non-woven silica-containing mat. The reinforcing component was 0.1 wt % based on the total final weight of the cementitious material.

For this Sample 3, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 2% to 20 $m^2/g$.

The cured material of Sample 3 formed a cementitious material which as stable in water at 60 degrees Celsius for 24 hours using the Jet Products, LLC Warm Water Stability Test as authenticated by Clemson University Chemical Engineering Department in 2017.

In this example, the foam component is a polyurethane that is expanded into an expanded closed cell foam having a thickness of 1.5 inches and a density of 3 pounds/cubic foot that self-adheres to the cementitious material forming an ultra-stable structural laminate with fire resistance and a lateral nail pull strength of 110 pounds of force, an insulation R value of 11, a resistance to seismic impact for earthquakes over 3.1 on the Richter Scale, a break point of 29 lbs/inch; and a resistance to wind shear equivalent to a 15 mph downburst.

Sample 4

Sample 4 of the ultra-stable structural laminate contains a cementitious material with 31 wt % of a magnesium oxide dry powder containing 85 wt % of magnesium oxide based on a final total weight of the of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 16 wt % of a magnesium chloride dissolved in water based on a final total weight of the cementitious material.

For Sample 4, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 1 wt % of a stabilizing material with a phosphorus-containing compound based on a final total weight of the cementitious material to the mixed liquid suspension.

For Sample 4, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

The reinforcing component was 2 wt % chopped silica fibers based on the total final weight of the cementitious material.

For this Sample 4, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 23% to 24 $m^2/g$.

The cured material of Sample 4 formed a cementitious material which as stable in water at 60 degrees Celsius for 24 hours using the Jet Products, LLC Warm Water Stability Test as authenticated by Clemson University Chemical Engineering Department in 2017.

In this example, the foam component is a polyurethane and the polyurethane is expanded into an expanded closed cell foam having a thickness of 2.5 inches and a density of 1.7 pounds/cubic foot that self-adheres to the cementitious material forming an ultra-stable structural laminate with fire resistance and a lateral nail pull strength of 139 pounds of force, an insulation R value of 16, a resistance to seismic impact for earthquakes over 3.1 on the Richter Scale, a break point of 44 lbs/inch; and a resistance to wind shear equivalent to a 15 mph downburst.

Sample 5

Sample 5 of the ultra-stable structural laminate has a cementations material that contains 32.5 wt % of a magnesium oxide dry powder containing 85 wt % of magnesium oxide based on a final total weight of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 17.5 wt % of a magnesium chloride dissolved in water based on a final total weight of the cementitious material.

For Sample 5, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 1.75 wt % of a stabilizing material with a phosphorus-containing compound based on a final total weight of the cementitious material to the mixed liquid suspension.

For Sample 5, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 5 contains 0.1 wt % of aggregate component known as wood:perlite:styrene based foam beads in a 30:8:1 ratio based on the total final weight of the cementitious material was added into the amorphous phase cementitious material forming a flowable concrete.

The flowable, uncured concrete was then poured on a mold and cured to make a finished concrete. The expanded closed cell foam was disposed over the concrete and the two reacted to form the ultra-stable structural laminate.

For this Sample 5, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 38% to 27 m$^2$/g.

The cured material of Sample 5 formed a cementitious material which as stable in water at 60 degrees Celsius for 24 hours using the Jet Products, LLC. Warm Water Stability Test as authenticated by Clemson University Chemical Engineering Department in 2017.

In this example, the foam component is a polyurethane and the polyurethane is expanded into an expanded closed cell foam having a thickness of 8 inches and a density of 3 pounds/cubic foot that self-adheres to the cementitious material forming an ultra-stable structural laminate with fire resistance and a lateral nail pull strength of 300 pounds of force, an insulation R value of 40, a resistance to seismic impact for earthquakes over 3.1 on the Richter Scale, a break point of 100 lbs/inch; and a resistance to wind shear equivalent to a 15 mph downburst.

Sample 6

Sample 6 of the ultra-stable structural laminate contains a cementitious material with 33 wt % of a magnesium oxide dry powder containing 85 wt % of magnesium oxide based on a final total weight of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 6, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 2.5 wt % of a stabilizing material with a phosphorus-containing compound based on a final total weight of the cementitious material the mixed liquid suspension.

For Sample 6, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 6 contains 30 wt % of aggregate component of wood:perlite:styrene based foam beads in a 30:8:1 ratio based on the total final weight of the cementitious material was added into the amorphous phase cementitious material forming a flowable concrete.

The flowable, uncured concrete was then poured into a mold and cured to make a finished concrete.

For this Sample 6, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 49% to 29 m$^2$/g.

The cured material of Sample 6 formed a cementitious material which as stable in water at 60 degrees Celsius for 24 hours using the Jet Products, LLC Warm Water Stability Test as authenticated by Clemson University Chemical Engineering Department in 2017.

In this example, the foam component is a polyurethane and the polyurethane is expanded into an expanded closed cell foam using a catalyst to have a thickness of 3 inches and a density of 2 pounds/cubic foot that self-adheres to the cementitious material forming an ultra-stable structural laminate with fire resistance and a lateral nail pull strength of 166 pounds of force, an insulation R value of 19, a resistance to seismic impact for earthquakes over 3.1 on the Richter Scale, a break point of 51 lbs/inch; and a resistance to wind shear equivalent to a 15 mph downburst.

Sample 7

Sample 7 of the ultra-stable structural laminate contains a cementitious material with 33 wt % of a magnesium oxide dry powder containing 85 wt % of magnesium oxide based on a final total weight of the cementitious material was used.

The magnesium oxide had a surface area ranging from 5 meters$^2$/gram to 50 meters/gram and an average particle size ranging from about 0.3 to about 90 microns wherein more than about 90% by weight magnesium oxide particles were less than or equal to about 40 microns.

The magnesium oxide was blended with 19 wt % of a magnesium chloride dissolved in water based on a final total weight of the cementitious material.

For Sample 7, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 3.75 wt % of a stabilizing material with a phosphorus-containing compound based on a final total weight of the cementitious material to the mixed liquid suspension.

For Sample 7, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 7 contains a biomass of 0.1 weight percent based on the total final weight of the cementitious material. The biomass of this example was rice husks.

For this Sample 7, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 49% to 29 m$^2$/g.

The cured material of Sample 7 formed a cementitious material which as stable in water at 60 degrees Celsius for 24 hours using the Jet Products, LLC Warm Water Stability Test as authenticated by Clemson University Chemical Engineering Department in 2017.

In this example, the foam component is a polyurethane and the polyurethane is expanded into an expanded closed cell foam having a thickness of 3.5 inches and a density of 1.7 pounds/cubic foot that self-adheres to the cementitious material forming an ultra-stable structural laminate with fire resistance and a lateral nail pull strength of 170 pounds of force, an insulation R value of 22, a resistance to seismic impact for earthquakes over 3.1 on the Richter Scale, a break point of 56 lbs/inch; and a resistance to wind shear equivalent to a 15 mph downburst.

Sample 8

Sample 8 of the ultra-stable structural laminate contains a cementitious material of 32 wt % of a magnesium oxide dry powder containing 85 wt % of magnesium oxide based on a final total weight of the cementitious material was used.

The magnesium oxide had a surface area ranging from 5 meters$^2$/gram to 50 meters/gram and an average particle size ranging from about 0.3 to about 90 microns wherein more than about 90% by weight magnesium oxide particles were less than or equal to about 40 microns.

The magnesium oxide was blended with 17 wt % of a magnesium chloride dissolved in water based on a final total weight of the cementitious material.

For Sample 7, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 5 wt % of a stabilizing material with a phosphorus-containing compound based on a final total weight of the cementitious material to the mixed liquid suspension.

For Sample 8, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 8 contains 15 wt % of biomass based on the total final weight of the cementitious material was added into the amorphous phase cementitious material forming a flowable concrete. The biomass was corn husks.

The flowable, uncured concrete was then poured into a mold, the finished material forming a concrete.

For this Sample 8, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 44% to 28 m$^2$/g.

The cured material of Sample 8 formed a cementitious material which as stable in water at 60 degrees Celsius for 24 hours using the Jet Products, LLC Warm Water Stability Test as authenticated by Clemson University Chemical Engineering Department in 2017.

In this example, the foam component is a polyurethane and the polyurethane is expanded into an expanded closed cell foam having a thickness of 4 inches and a density of 1.7 pounds/cubic foot that self-adheres to the cementitious material forming an ultra-stable structural laminate with fire resistance and a lateral nail pull strength of 185 pounds of force, an insulation R value of 25, a resistance to seismic impact for earthquakes over 3.1 on the Richter Scale, a break point of 61 lbs/inch; and a resistance to wind shear equivalent to a 15 mph downburst.

Sample 9

Sample 9 of the ultra-stable structural laminate has a cementitious material that contains 35 wt % of a magnesium oxide dry powder containing 85 wt % of magnesium oxide based on a final total weight of the cementitious material was used.

The magnesium oxide had a surface area ranging from 5 meters$^2$/gram to 50 meters/gram and an average particle size ranging from about 0.3 to about 90 microns wherein more than about 90% by weight magnesium oxide particles were less than or equal to about 40 microns.

The magnesium oxide was blended with 16 wt % of a magnesium chloride dissolved in water based on a final total weight of the cementitious material.

For Sample 9, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 6.25 wt % of a stabilizing material with a phosphorus-containing compound based on a final total weight of the cementitious material to the mixed liquid suspension.

For Sample 9, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

0.1 weight percent of a surfactant, namely a detergent was added to the amorphous phase cementitious material based on the final total weight of the cementitious material.

The flowable, uncured concrete was then poured into a mold forming a finished concrete.

For this Sample 9, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 23% to 24 m$^2$/g.

The cured material of Sample 9 formed a cementitious material which as stable in water at 60 degrees Celsius for 24 hours using the Jet Products, LLC Warm Water Stability Test as authenticated by Clemson University Chemical Engineering Department in 2017.

In this example, the foam component is a polyurethane and the polyurethane is expanded into an expanded closed cell foam using catalyst until the polyurethane has a thickness of 4.5 inches and a density of 1.7 pounds/cubic foot that self-adheres to the cementitious material forming an ultra-stable structural laminate with fire resistance and a lateral nail pull strength of 200 pounds of force, an insulation R value of 28, a resistance to seismic impact for earthquakes over 3.1 on the Richter Scale, a break point of 67 lbs/inch; and a resistance to wind shear equivalent to a 15 mph downburst.

Sample 10

Sample 10 of the ultra-stable structural laminate contains a cementitious material with 30 wt % of a magnesium oxide dry powder containing 85 wt % of magnesium oxide based on a final total weight of the cementitious material was used.

The magnesium oxide had a surface area ranging from 5 meters$^2$/gram to 50 meters/gram and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 10, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 7.5 wt % of a stabilizing material with a phosphorus-containing compound based on a final total weight of the cementitious material to the mixed liquid suspension.

For Sample 10, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 10 contains 10 wt % of sodium stearate as a surfactant, based on the total final weight of the cementitious material was added into the amorphous phase cementitious material forming a flowable concrete.

The flowable, uncured concrete was then poured in a mold forming a finished concrete.

For this Sample 10, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 38% to 27 m$^2$/g.

The cured material of Sample 10 formed a cementitious material which as stable in water at 60 degrees Celsius for 24 hours using the Jet Products, LLC Warm Water Stability Test as authenticated by Clemson University Chemical Engineering Department in 2017.

In this example, the foam component is a polyurethane and the polyurethane is expanded using a catalyst into an expanded closed cell foam having a thickness of 5 inches and a density of 2.1 pounds/cubic foot that self-adheres to the cementitious material forming an ultra-stable structural laminate with fire resistance and a lateral nail pull strength of 215 pounds of force, an insulation R value of 31, a resistance to seismic impact for earthquakes over 3.1 on the Richter Scale, a break point of 73 lbs/inch; and a resistance to wind shear equivalent to a 15 mph downburst.

Sample 11

Sample 11 of the ultra-stable structural laminate contains a cementitious material with 33 wt % of a magnesium oxide dry powder containing 85 wt % of magnesium oxide based on a final total weight of the cementitious material was used.

The magnesium oxide had a surface area ranging from 5 meters$^2$/gram to 50 meters/gram and an average particle size ranging from about 0.3 to about 90 microns wherein more than about 90% by weight magnesium oxide particles were less than or equal to about 40 microns.

The magnesium oxide was blended with 15 wt % of a magnesium chloride dissolved in water based on a final total weight of the cementitious material.

For Sample 11, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 8.75 wt % of a stabilizing material with a phosphorus-containing compound based on a final total weight of the cementitious material to the mixed liquid suspension.

For Sample 11, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

0.1 weight percent of re-dispersible polymer, namely vinyl acetate ethylene (VAE) was added to the amorphous phase cementitious material based on the final total weight of the cementitious material.

The flowable, uncured concrete was then poured into a mold forming a finished concrete.

For this Sample 11, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 49% to 29 $m^2/g$.

The cured material of Sample 11 formed a cementitious material which as stable in water at 60 degrees Celsius for 24 hours using the Jet Products, LLC Warm Water Stability Test as authenticated by Clemson University Chemical Engineering Department in 2017.

In this example, the foam component is polyurethane and the polyurethane is expanded into an expanded closed cell foam having a thickness of 0.5 inches and a density of 1.6 pounds/cubic foot that self-adheres to the cementitious material forming an ultra-stable structural laminate with fire resistance and a lateral nail pull strength 108 pounds of force, an insulation R value of 4, a resistance to seismic impact for earthquakes over 3.1 on the Richter Scale, a break point from 22 lbs/inch; and a resistance to wind shear equivalent to a 15 mph downburst.

Sample 12

Sample 12 of the ultra-stable structural laminate contains a cementitious material with contains 32 wt % of a magnesium oxide dry powder containing 85 wt % of magnesium oxide based on a final total weight of the cementitious material was used.

The magnesium oxide had a surface area ranging from 5 $meters^2$/gram to 50 meters/gram and an average particle size ranging from about 0.3 to about 90 microns wherein more than about 90% by weight magnesium oxide particles were less than or equal to about 40 microns.

The magnesium oxide was blended with 19 wt % of a magnesium chloride dissolved in water based on a final total weight of the cementitious material.

For Sample 12, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 10 wt % of a stabilizing material with a phosphorus-containing compound based on a final total weight of the cementitious material to the mixed liquid suspension.

For Sample 12, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 12 contains 5 wt % of vinyl acetate ethylene based on the total final weight of the cementitious material was added into the amorphous phase cementitious material forming a flowable concrete.

The flowable, uncured concrete was then poured into a mold forming finished concrete.

For this Sample 12, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 49% to 29 $m^2/g$.

The cured material of Sample 12 formed a cementitious material which as stable in water at 60 degrees Celsius for 24 hours using the Jet Products, LLC Warm Water Stability Test as authenticated by Clemson University Chemical Engineering Department in 2017.

In this example, the foam component is a polyurethane and the polyurethane is catalytically expanded into an expanded closed cell foam having a thickness of 0.75 inches and a density of 1.8 pounds/cubic foot that self-adheres to the cementitious material forming an ultra-stable structural laminate with fire resistance and a lateral nail pull strength of 82 pounds of force, an insulation R value of 5, a resistance to seismic impact for earthquakes over 3.1 on the Richter Scale, a break point of 23 lbs/inch; and a resistance to wind shear equivalent to a 15 mph downburst.

What is claimed is:
1. An ultra-stable structural laminate comprising:
   (i) a cementitious material comprising:
      (a) 29 wt % to 40 wt %, based on the final total weight of the cementitious material, of a magnesium oxide dry powder containing 80 wt % to 98 wt % of magnesium oxide, the magnesium oxide having a surface area ranging from 5 $meters^2$/gram to 50 $meters^2$/gram and an average particle size ranging from about 0.3 to about 90 microns wherein more than about 90% by weight magnesium oxide particles are less than or equal to about 40 microns;
      (b) 14 wt % to 18 wt %, based on the final total weight of the cementitious material, of magnesium chloride;

(c) 0.1 wt % to 10 wt %, based on the final total weight of the cementitious material, of a stabilizing material, the stabilizing material comprising:
   a. an aqueous solution comprising of 55 wt % to 65 wt % of phosphorous acid ($H_3PO_3$); or
   b. an aqueous solution comprising of 80 wt % to 90 wt % of phosphoric acid ($H_3PO_4$);
   wherein the cementitious material comprises a plurality of crystals and an amorphous phase cementitious material, each of the plurality of crystals having a MW within the range of 280 to 709, the amorphous phase cementitious material encapsulating the plurality of crystals,
   wherein a majority of the stabilizing material is consumed during curing into a nano-molecular veneer while increasing a surface area of the plurality of crystals by 2% to 49% during curing,
   wherein the cured nano-molecular veneer comprises nano-molecular elements which are insoluble in water and the cured nano-molecular veneer protects the plurality of crystals of the formed cementitious material from degradation in water at temperatures from 20 degrees to 60 degrees Celsius for from 24 hours to 56 days; and
(ii) a foam component catalytically reacted into an expanded closed cell foam having a thickness from $\frac{1}{8}^{th}$ inch to 8 inches, a density from 1.5 pounds/cubic foot to 3 pounds/cubic foot that self-adheres to the cementitious material, and
wherein the ultra-stable structural laminate with fire resistance has a lateral nail pull strength from 44 pounds to 300 pounds of force; an insulation R value from 1 to 40; a resistance to seismic impact for earthquakes over 3.1 on the Richter Scale; a break point from 7 lbs/inch to 100 lbs/inch; and a resistance to wind shear equivalent to a 15 mph downburst.

2. The ultra-stable structural laminate of claim 1, further comprising in the cementitious material: 0.1 wt % to 30 wt % of an aggregate based on a final total weight of the cementitious material, the aggregate comprising particles, having a diameter from 1 nm to 10 mm, wherein the aggregate comprises wood, perlite, styrene based foam beads, calcium carbonate powder, glass particulate, or combinations thereof.

3. The ultra-stable structural laminate of claim 2, further comprising in the cementitious material: 0.1 wt % to 2 wt % of a reinforcing material based on the final total weight of the cementitious material, the reinforcing material comprising a non-woven or woven silica containing mat, or a non-woven or woven hydrocarbon containing mat.

4. The ultra-stable structural laminate of claim 2, further comprising in the cementitious material: 0.1 wt % to 10 wt % of at least one surfactant based on the final total weight of the cementitious material.

5. The ultra-stable structural laminate of claim 4, wherein the surfactant is a detergent.

6. The ultra-stable structural laminate of claim 2, further comprising in the cementitious material: 0.1 weight percent to 5 weight percent of a re-dispersible powder polymer based on the final total weight of the cementitious material.

7. The ultra-stable structural laminate of claim 6, wherein the redispersible powder polymer is selected from the group consisting of a silicone, a polyurethane dispersion, a polyurethane, a polymer of an alkyl carboxylic acid vinyl ester monomer, a polymer of a branched or unbranched alcohol ester of acid monomer, a polymer of a vinyl aromatic monomer, a polyolefin, a polydiene, a polyvinyl halide, and a copolymer of vinyl acetate and ethylene.

8. The ultra-stable structural laminate of claim 6, further comprising in the cementitious material: 0.1 weight percent to 5 weight percent based on the final total weight of the cementitious material of an acrylic or a styrene butadiene rubber (SBR).

9. The ultra-stable structural laminate of claim 1, further comprising in the cementitious material: 0.1 weight percent to 15 weight percent biomass added to the amorphous phase cementitious material based on the final total weight of the cementitious material.

10. The ultra-stable structural laminate of claim 9, wherein the biomass is selected from the group consisting of rice husks, corn husks, and dung.

11. The ultra-stable structural laminate of claim 1, wherein the expanded closed cell foam is a pentane blown closed cell polyurethane foam.

12. The ultra-stable structural laminae of claim 1, wherein the foam component comprises at least one member selected from the group consisting of a polyurethane, a polyisocyanurate and a polystyrene.

13. The ultra-stable structural laminate of claim 1, further comprising in the cementitious material: 0.1 wt % to 15 wt % of a reinforcing material based on the final total weight of the cementitious material, the reinforcing material comprising
   (i) chopped silica containing fibers;
   (ii) hemp containing fibers;
   (iii) nano-molecular carbon fiber strands;
   (iv) chopped carbon fibers;
   (v) chopped hydrocarbon fibers; td or combinations thereof.

14. The ultra-stable structural laminate of claim 13, wherein the reinforcing material is chopped carbon fibers.

15. The ultra-stable structural laminate of claim 1, wherein the magnesium chloride is provided by an aqueous solution comprising 27 wt % magnesium chloride or 28 wt % magnesium chloride.

* * * * *

UNITED STATES PATENT AND TRADEMARK OFFICE
CERTIFICATE OF CORRECTION

PATENT NO. : 11,117,836 B2
APPLICATION NO. : 16/216687
DATED : September 14, 2021
INVENTOR(S) : James A. Wambaugh, Brett Rochner and Cole J. Weinberger Page 1 of 1

It is certified that error appears in the above-identified patent and that said Letters Patent is hereby corrected as shown below:

In the Claims

Column 26, Line 45, in Claim 13, after "(v) chopped hydrocarbon fibers;" delete "td".

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*